(12) United States Patent
Chen

(10) Patent No.: US 11,841,821 B1
(45) Date of Patent: Dec. 12, 2023

(54) SERVER MANAGEMENT FRAMEWORK AND SERVER

(71) Applicant: SHANDONG YINGXIN COMPUTER TECHNOLOGIES CO., LTD., Shandong (CN)

(72) Inventor: Zhanliang Chen, Shandong (CN)

(73) Assignee: SHANDONG YINGXIN COMPUTER TECHNOLOGIES CO., LTD., Shandong (CN)

( * ) Notice: Subject to any disclaimer, the term of this patent is extended or adjusted under 35 U.S.C. 154(b) by 0 days.

(21) Appl. No.: 18/270,232

(22) PCT Filed: Apr. 26, 2022

(86) PCT No.: PCT/CN2022/089138
§ 371 (c)(1),
(2) Date: Jun. 29, 2023

(87) PCT Pub. No.: WO2022/228408
PCT Pub. Date: Nov. 3, 2022

(30) Foreign Application Priority Data

Apr. 29, 2021 (CN) .......................... 202110477156.9

(51) Int. Cl.
*G06F 13/42* (2006.01)
*G06F 13/24* (2006.01)
*G06F 1/26* (2006.01)

(52) U.S. Cl.
CPC .......... *G06F 13/4282* (2013.01); *G06F 1/266* (2013.01); *G06F 13/24* (2013.01); *G06F 2213/0016* (2013.01)

(58) Field of Classification Search
CPC ...... G06F 13/4282; G06F 1/266; G06F 13/24; G06F 2213/0016
See application file for complete search history.

(56) References Cited

U.S. PATENT DOCUMENTS

2011/0191573 A1 8/2011 Li et al.
2016/0118121 A1* 4/2016 Kelly ................. G06F 1/28
710/301

(Continued)

FOREIGN PATENT DOCUMENTS

CN 102340517 A 2/2012
CN 106897243 A 6/2017
(Continued)

*Primary Examiner* — Henry Tsai
*Assistant Examiner* — Harry Z Wang
(74) *Attorney, Agent, or Firm* — IPro, PLLC

(57) ABSTRACT

The present disclosure discloses a server management framework and a server. The server management framework includes: a management board, wherein the management board comprises a baseboard management controller, a platform controller hub, and a management board complex programming logic device (CPLD), and a first end of the management board CPLD is connected to the platform controller hub; and a motherboard, wherein the motherboard comprises a central processing unit and a motherboard CPLD, a first end of the motherboard CPLD is connected to the central processing unit, and a second end of the motherboard CPLD is connected to a second end of the management board CPLD, so that the baseboard management controller communicates with the management board CPLD through the motherboard CPLD, and the platform controller hub communicates with the baseboard management controller through the motherboard CPLD and the management board CPLD.

20 Claims, 2 Drawing Sheets

(56) References Cited

U.S. PATENT DOCUMENTS

| | | | |
|---|---|---|---|
| 2016/0266626 A1 | 9/2016 | Bandholz et al. | |
| 2016/0328300 A1* | 11/2016 | Rahardjo | G06F 11/1417 |
| 2018/0074984 A1* | 3/2018 | Olarig | G06F 13/36 |
| 2019/0220340 A1* | 7/2019 | Chou | G06F 11/0709 |
| 2020/0064402 A1* | 2/2020 | Wu | G06F 11/2236 |
| 2021/0109885 A1* | 4/2021 | Guo | G06F 1/04 |
| 2023/0047735 A1* | 2/2023 | Wang | G06F 13/4081 |

FOREIGN PATENT DOCUMENTS

| | | |
|---|---|---|
| CN | 110515801 A | 11/2019 |
| CN | 110764585 A | 2/2020 |
| CN | 111209241 A | 5/2020 |
| CN | 111459768 A | 7/2020 |
| CN | 112463475 A | 3/2021 |
| CN | 112463667 A | 3/2021 |
| CN | 113204510 A | 8/2021 |

* cited by examiner ns, a first
end of the management board CPLD being connected to the
platform controller hub; and# SERVER MANAGEMENT FRAMEWORK AND SERVER

CROSS-REFERENCE TO RELATED APPLICATION

The present disclosure claims priority to Chinese patent application No. 202110477156.9 titled "SERVER MANAGEMENT FRAMEWORK AND SERVER", filed on Apr. 29, 2021, which is incorporated herein in its entirety by reference.

TECHNICAL FIELD

The present disclosure relates to the technical field of servers, in particular to a server management framework and a server.

BACKGROUND

Two main control chips, i.e., a central processing unit (CPU for short) and a platform controller hub (PCH for short) are included in an x86 platform framework of Intel, and the peripheral hardware design of the PCH is basically consistent in different product demands. In addition, a server further includes a baseboard management controller (BMC for short) which is a key component for monitoring and managing the server, has a higher authority than a host server, and plays a vital role in the remote deployment and management of a server system. In order to improve the reusability of hardware modules, the PCH and the BMC are usually stripped from a motherboard. When there are different product demands, a solution of the motherboard may be redesigned to meet the different product demands. Each of the two board cards is designed with a complex programming logic device (CPLD) for board card timing management and logical function design and further implementing information interaction between the two board cards.

SUMMARY

In a first aspect, an embodiment of the present disclosure provides a server management framework, including:

a management board including a baseboard management controller, a platform controller hub, and a management board complex programming logic device (CPLD), a first end of the management board CPLD being connected to the platform controller hub; and a motherboard including a central processing unit and a motherboard CPLD, a first end of the motherboard CPLD being connected to the central processing unit, and a second end of the motherboard CPLD being connected to a second end of the management board CPLD, so that the baseboard management controller communicates with the management board CPLD through the motherboard CPLD, and the platform controller hub communicates with the baseboard management controller through the motherboard CPLD and the management board CPLD.

In an embodiment, the baseboard management controller is connected to the motherboard CPLD through an inter-integrated circuit (I2C) bus interface.

In an embodiment, the management board CPLD is connected to the motherboard CPLD through a low-voltage differential signaling interface.

In an embodiment, the management board CPLD includes a non-maskable interrupt (NMI) generator and a first low-voltage differential signaling (LVDS) module, and the motherboard CPLD includes an I2C slave interface, an NMI register, and a second LVDS module; the baseboard management controller is connected to a first end of the I2C slave interface through the I2C bus, a second end of the I2C slave interface is connected to a first end of the NMI register, and the platform controller hub is connected to a first end of the NMI generator; and a second end of the NMI register is connected to a first end of the second LVDS module through an NMI_TRIGGER signal and an NMI_DONE signal, a second end of the second LVDS module is connected to a first end of the first LVDS module through a low-voltage differential signal, and a second end of the first LVDS module is connected to a second end of the NMI generator through an NMI_TRIGGER signal and an NMI_DONE signal.

In an embodiment, the baseboard management controller is configured to write data into the NMI register through an I2C command; the motherboard CPLD is configured to parse the data written into the NMI register to obtain state information of the NMI register, and transmit the state information to the management board CPLD by the second LVDS module; and the management board CPLD is configured to receive the state information by the first LVDS module, and transmit the state information to the NMI generator, so that the NMI generator generates an interrupt signal based on the state information and transmits the interrupt signal to the platform controller hub.

In an embodiment, the management board CPLD is further configured to generate an interrupt_done signal by the NMI generator in response to the interrupt signal being transmitted, and start a timer in response to the interrupt_done signal being generated; the motherboard CPLD is configured to receive the interrupt_done signal, clear data in the NMI register, and transmit information of the NMI register with the data being cleared to the management board CPLD; the management board CPLD is further configured to reset the timer in response to receiving the information of the NMI register with the data being cleared; or the management board CPLD is further configured to regenerate an interrupt signal and feed back an interrupt_done signal again in response to having not received the information of the NMI register with the data being cleared.

In an embodiment, the motherboard further includes a power chip and a power supply unit (PSU); and the power chip and the PSU are both connected to the motherboard CPLD.

In an embodiment, the management board further includes an indicator light connected to the management board CPLD; and the management board CPLD is configured to transmit a user indicator light signal and a health indicator light signal to the indicator light.

In an embodiment, the management board CPLD is configured to transmit a power button signal and an interrupt signal to the platform controller hub.

In a second aspect, an embodiment of the present disclosure provides a server including the server management framework described above.

BRIEF DESCRIPTION OF THE DRAWINGS

In order to more clearly illustrate embodiments of the present disclosure or technical solutions of the related art, figures that are required to describe the embodiments or the related art will be briefly introduced below. Apparently, the figures that are described below illustrates merely some embodiments of the present disclosure, and those skilled in the art may obtain other figures according to these figures without paying creative effort.

DETAILED DESCRIPTION

In order to make solutions and advantages of the present disclosure clearer, embodiments of the present disclosure will be further described in detail below in conjunction with specific embodiments and with reference to the accompanying drawings.

It should be noted that all expressions using "first" and "second" in the embodiments of the present disclosure are intended to distinguish two different entities or different parameters with the same name. It may be seen that "first" and "second" are only for facilitating expression, but should not be understood as limitations on the present disclosure, which will not be explained one by one in the subsequent embodiments.

Figure 1:
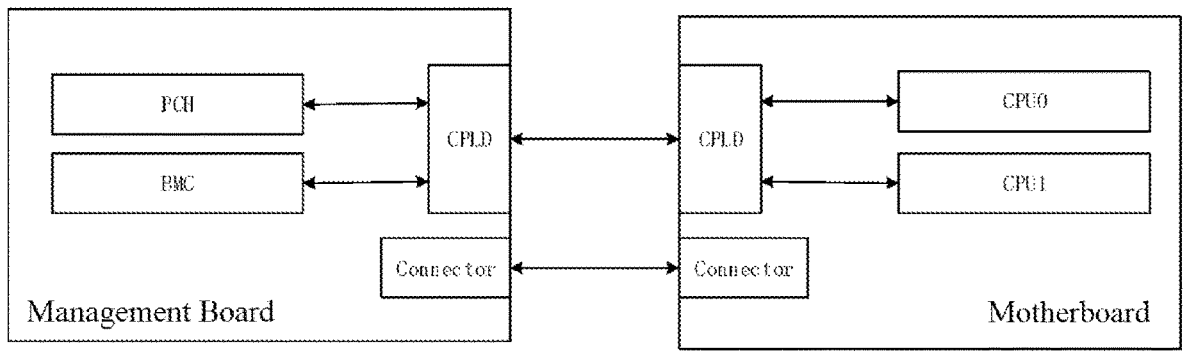
FIG. 1 is a schematic diagram illustrating a traditional server management framework.
Figure 2:
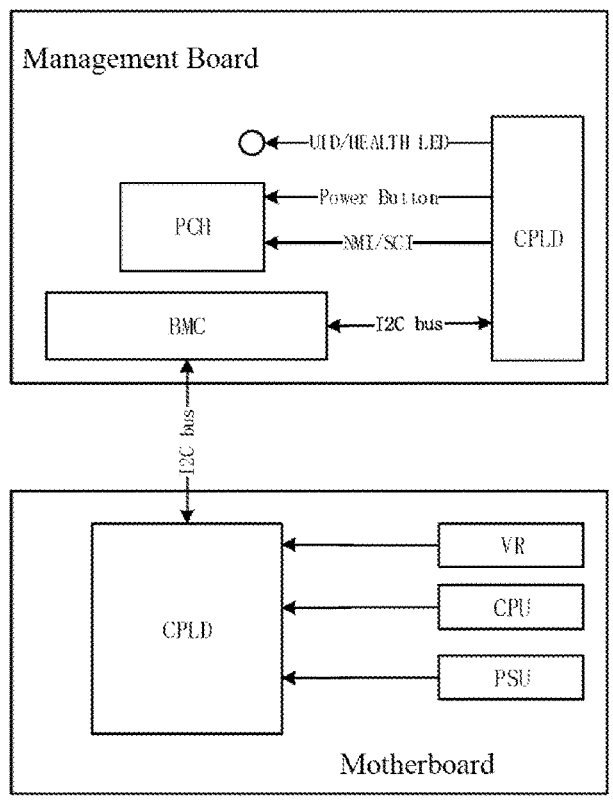
FIG. 2 is a schematic diagram illustrating another traditional server management framework.

Two traditional server management frameworks are shown in FIG. 1 and FIG. 2. In the server management framework shown in FIG. 1, a management chip BMC only exists on a management board; and in a traditional design, the BMC is required to communicate with both of the two CPLDs, thereby implementing the management control on the management board and the motherboard. As further shown in FIG. 2, the BMC communicates with the CPLD on the management board to control a unit identification (UID) light and a health light, and implement interrupt control on a power button, non-maskable interrupt (NMI), etc.; and the BMC communicates with the CPLD on the motherboard to acquire the state of the CPU, the state of a PSU, the state of a VR, etc.

The traditional server management framework has three main problems: firstly, a design solution of the BMC will be different from design solutions where the PCH and the CPU are provided on the same board card, resulting in no-inheritance in the design of the BMC; secondly, a logic design of the CPLD is required to be implemented in different inter-integrated circuit (I2C) threads, resulting in a high resource occupancy rate and a reduced performance of the BMC; and thirdly, the interaction functions between the BMC and the CPLDs are not uniform, which is not conducive to a modular design.

Figure 3:
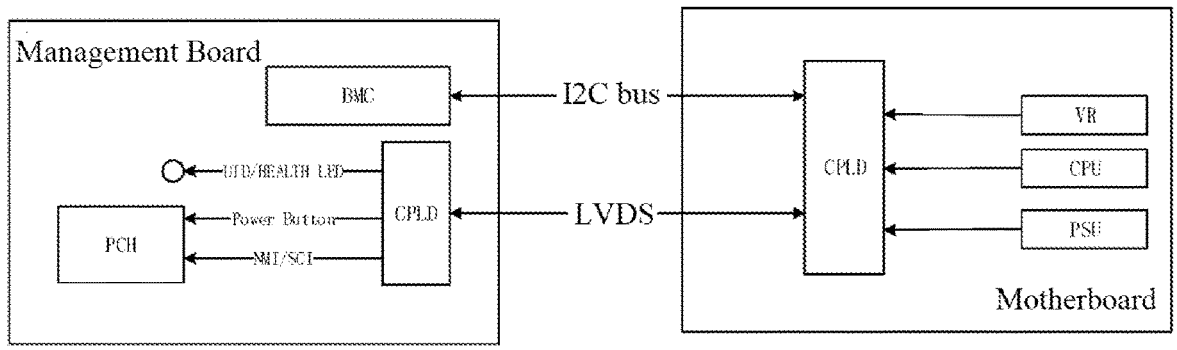
FIG. 3 is a schematic diagram illustrating a server management framework according to one or more embodiments.

In a first aspect, as shown in FIG. 3, an embodiment of the present disclosure provides a server management framework, including:

a management board, the management board including a baseboard management controller, a platform controller hub, and a management board complex programming logic device (CPLD), and a first end of the management board CPLD being connected to the platform controller hub; and a motherboard, the motherboard including a central processing unit and a motherboard CPLD, a first end of the motherboard CPLD being connected to the central processing unit, and a second end of the motherboard CPLD being connected to a second end of the management board CPLD, so that the baseboard management controller communicates with the management board CPLD through the motherboard CPLD, and the platform controller hub communicates with the baseboard management controller through the management board CPLD and the motherboard CPLD.

The above-mentioned server management framework mainly includes the management board and the motherboard; the management board includes the baseboard management controller, the platform controller hub, and the management board CPLD, and the first end of the management board CPLD is connected to the platform controller hub; and the motherboard includes the central processing unit and the motherboard CPLD, the first end of the motherboard CPLD is connected to the central processing unit, and the second end of the motherboard CPLD is connected to the second end of the management board CPLD, so that the baseboard management controller communicates with the management board CPLD through the motherboard CPLD, and the platform controller hub communicates with the baseboard management controller through the management board CPLD and the motherboard CPLD. Therefore, the baseboard management controller has better inheritance, the resource occupancy rate of the baseboard management controller is remarkably reduced, the data transmission efficiency and the performance of the server may be favorably improved, and a modular design is facilitated.

In another embodiment, the baseboard management controller is connected to the motherboard CPLD through an inter-integrated circuit (I2C) bus interface.

In another embodiment, the management board CPLD is connected to the motherboard CPLD through a low-voltage differential signaling (LVDS) interface.

Figure 5:
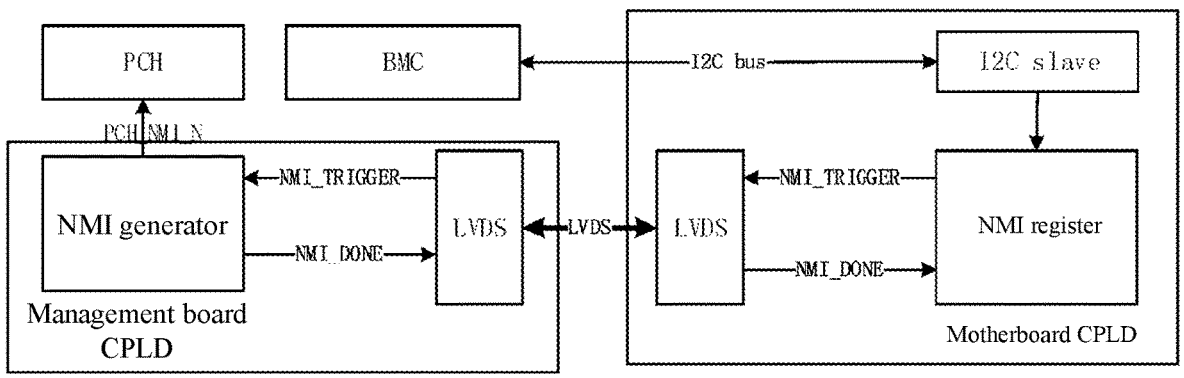
FIG. 5 shows an NMI trigger implementation mechanism of the server management framework according to one or more embodiments.

In another embodiment, as shown in FIG. 3 and FIG. 5, the management board CPLD includes a non-maskable interrupt (NMI) generator and a first LVDS module, and the motherboard CPLD includes an I2C slave interface, an NMI register, and a second LVDS module.

The baseboard management controller is connected to a first end of the I2C slave interface through an I2C bus, a second end of the I2C slave interface is connected to a first end of the NMI register, and the platform controller hub is connected to a first end of the NMI generator.

A second end of the NMI register is connected to a first end of the second LVDS module through an NMI_TRIGGER signal and an NMI_DONE signal, a second end of the second LVDS module is connected to a first end of the first LVDS module through a low-voltage differential signal, and a second end of the first LVDS module is connected to a second end of the NMI generator through an NMI_TRIGGER signal and an NMI DONE signal.

Figure 4:
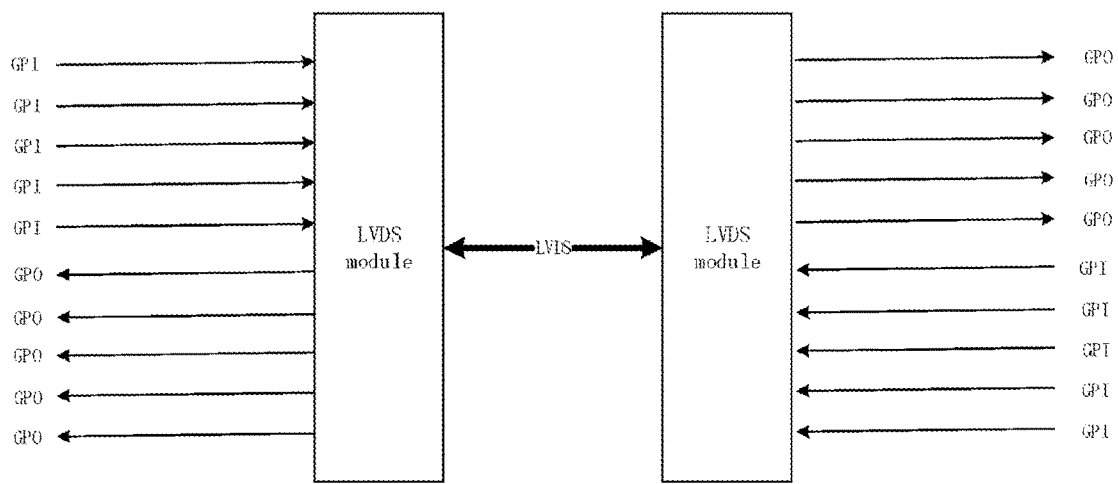
FIG. 4 is a schematic diagram illustrating interaction between a management board CPLD and a motherboard CPLD according to another embodiment.

As shown in FIG. 4, only general-purpose input/output (GPIO) signals are transmitted between the two (the management board and the motherboard) CPLDs of the server management framework in the embodiment of the present disclosure, and when any one piece of GPIO data in the two CPLDs flips, the LVDS modules may transmit data variation immediately to ensure that the data may be transmitted in time. Moreover, mechanisms such as cyclic redundancy check (CRC)/error correcting code (ECC) check are introduced in a process that the data is processed by the LVDS modules, so as to ensure the correctness of data transmission; moreover, a data re-transmission mechanism is introduced to ensure the stability of the data.

In another embodiment, the baseboard management controller is configured to write data into the NMI register through an I2C command; the motherboard CPLD is configured to parse the data written into the NMI register to obtain state information of the NMI register, and transmit the state information to the management board CPLD through the second LVDS module; the management board CPLD is configured to receive the state information through the first LVDS module, and transmit the state information to the NMI generator, so that the NMI generator generates an interrupt signal based on the state information and transmits the interrupt signal to the platform controller hub.

In another embodiment, the management board CPLD is further configured to generate an interrupt_done signal by the NMI generator in response to the interrupt signal being transmitted, and start a timer in response to the interrupt_done signal being generated; the motherboard CPLD is further configured to receive the interrupt_done signal, clear data in the NMI register, and transmit information of the NMI register with the data being cleared to the management board CPLD; the management board CPLD is further configured to reset the timer in response to receiving the information of the NMI register with the data being cleared; or the management board CPLD is further configured to regenerate an interrupt signal and feed back an interrupt_done signal again in response to having not received the information of the NMI register with the data being cleared.

In order to facilitate a process of interaction between the baseboard management controller and the management board in the server management framework in the present disclosure, as shown in FIG. 5, since a direct data interaction between the baseboard management controller and the management board CPLD will not performed, the motherboard CPLD is used to achieve relevant functions. With the implementation of NMI interrupt triggering as an example, a process of data interaction between the baseboard management controller and the management board CPLD is described, and the interrupt triggering of a NMI signal may be implemented by the following steps:

At step 1, the baseboard management controller writes the NMI register through an I2C command.

At step 2, after parsing the NMI register, the motherboard CPLD transmits a state of the NMI register to the management board CPLD through the second LVDS module.

At step 3, after receiving the state of the NMI register and generating a low pulse of 500 ms, the management board CPLD feeds back an interrupt_done signal, and starts an internal timer.

At step 4, after receiving the interrupt_done signal, the motherboard CPLD clears the NMI register, and transmits the updated NMI register to the management board CPLD.

At step 5, after receiving the updated NMI register, the management board CPLD resets the timer to wait for the next NMI trigger signal.

At step 6, in response to having not received the updated NMI register, the management board CPLD regenerates an interrupt pulse signal and feeds back the interrupt_done signal again.

It should be noted that other functional interaction between the baseboard management controller and the management board CPLD, for example a remote power-on/off function implemented by the baseboard management controller and health light control implemented by the baseboard management controller, etc., may be implemented by such an interaction solution.

The server management framework in the present disclosure at least has the following beneficial technical effects:

(1) the baseboard management controller and the management board CPLD are disposed on the same board card, but the baseboard management controller chooses to communicate with the motherboard CPLD;

(2) the management board may be matched with different motherboard designs, if the baseboard management controller interacts and communicates with the management board, when the motherboard is required to be changed, a logic design of the management board CPLD is also required to be changed, which is not conductive to the consistency of the modular design; however, if the baseboard management controller interacts and communicates with the motherboard CPLD, it may ensure the consistency of the design of the management board CPLD; and (3) the baseboard management controller needs to read more data information from the motherboard, and thus, the baseboard management controller directly performs data communication with the motherboard CPLD, which may reduce the data transmission between the two CPLDs, and may further increase the data transmission efficiency.

In another embodiment, the motherboard further includes a power chip and a power supply unit (PSU). As further shown in FIG. 3, the power chip is a VR chip, the PSU is short for the power supply unit and is usually directly referred to as a power supplier which is PSU or a power source for short.

The power chip and the PSU are both connected to the motherboard CPLD.

In another embodiment, the management board further includes an indicator light connected to the management board CPLD.

The management board CPLD is configured to transmit a user indicator light signal and a health indicator light signal to the indicator light. The user indicator light signal is an UID LED signal, and the health indicator light signal is a HEALTH LED signal.

In another embodiment, the management board CPLD is configured to transmit a power button signal (Power Button) and an interrupt signal (NMI/SCI) to the platform controller hub.

In a second aspect, an embodiment of the present disclosure further provides a server including the above-mentioned server management framework.

The exemplary embodiments of the present disclosure are described above. However, it should be noted that various changes and modifications can be made without departing from the scope of the embodiments of the present disclosure as defined by the claims. In addition, although the elements disclosed in the embodiments of the present disclosure may be described or required in an individual form, they may also be understood as plural unless explicitly limited to a singular number.

It should be understood that a singular form "a" and "an" as used herein is intended to include the plural forms as well, unless the context clearly supports an exception. It should also be understood that "and/or" as used herein is meant to include any and all possible combinations of one or more of the associated listed items.

The serial numbers of the embodiments disclosed above are only for description, and do not represent the advantages and disadvantages of the embodiments.

Those skilled in the art should understand that the discussion of any of the above embodiments is exemplary only, and is not intended to imply that the scope (including claims) of the embodiments of the present disclosure is limited to these examples. Under the idea of the embodiments of the present disclosure, the technical features in the above embodiments or different embodiments can also be combined, and there are many other changes in different aspects of the above embodiments of the present disclosure, which are not provided in details for the sake of brevity. Therefore, within the spirit and principle of the embodiments of the present disclosure, any omissions, modifications, equivalent replacements, improvements, etc., shall be included in the protection scope of the embodiments of the present disclosure.

The invention claimed is:

1. A server management framework, comprising:
   a management board, wherein the management board comprises a baseboard management controller, a platform controller hub, and a management board complex programming logic device (CPLD), and a first end of the management board CPLD is connected to the platform controller hub; and
   a motherboard, wherein the motherboard comprises a central processing unit and a motherboard CPLD, a first end of the motherboard CPLD is connected to the central processing unit, and a second end of the motherboard CPLD is connected to a second end of the management board CPLD, so that the baseboard management controller communicates with the management board CPLD through the motherboard CPLD, and the platform controller hub communicates with the baseboard management controller through the motherboard CPLD and the management board CPLD.

2. The server management framework according to claim 1, wherein the baseboard management controller is connected to the motherboard CPLD through an inter-integrated circuit (I2C) bus interface.

3. The server management framework according to claim 2, wherein the management board CPLD is connected to the motherboard CPLD through a low-voltage differential signaling interface.

4. The server management framework according to claim 3, wherein the management board CPLD comprises a non-maskable interrupt (NMI) generator and a first low-voltage differential signaling (LVDS) module, and the motherboard CPLD comprises an I2C slave interface, an NMI register, and a second LVDS module;
   wherein the baseboard management controller is connected to a first end of the I2C slave interface through the I2C bus, a second end of the I2C slave interface is connected to a first end of the NMI register, and the platform controller hub is connected to a first end of the NMI generator; and
   a second end of the NMI register is connected to a first end of the second LVDS module through an NMI_TRIGGER signal and an NMI_DONE signal, a second end of the second LVDS module is connected to a first end of the first LVDS module through a low-voltage differential signal, and a second end of the first LVDS module is connected to a second end of the NMI generator through the NMI_TRIGGER signal and the NMI_DONE signal.

5. The server management framework according to claim 4, wherein the baseboard management controller is configured to write data into the NMI register through an I2C command;
   the motherboard CPLD is configured to parse the data written into the NMI register to obtain state information of the NMI register, and transmit the state information to the management board CPLD by the second LVDS module; and
   the management board CPLD is configured to receive the state information by the first LVDS module, and transmit the state information to the NMI generator, so that the NMI generator generates an interrupt signal based on the state information and transmits the interrupt signal to the platform controller hub.

6. The server management framework according to claim 5, wherein the management board CPLD is further configured to generate an interrupt_done signal by the NMI generator in response to the interrupt signal having being transmitted, and start a timer in response to the interrupt_done signal being generated;
   the motherboard CPLD is configured to receive the interrupt_done signal, clear data in the NMI register, and transmit information of the NMI register with the data being cleared to the management board CPLD;
   the management board CPLD is further configured to reset the timer in response to receiving the information of the NMI register with the data being cleared; or
   the management board CPLD is further configured to regenerate an interrupt signal and feed back an interrupt_done signal again in response to having not received the information of the NMI register with the data being cleared.

7. The server management framework according to claim 1, wherein the motherboard further comprises a power chip and a power supply unit (PSU); and
   the power chip and the PSU are both connected to the motherboard CPLD.

8. The server management framework according to claim 1, wherein the management board further comprises an indicator light connected to the management board CPLD;
   wherein the management board CPLD is configured to transmit a user indicator light signal and a health indicator light signal to the indicator light.

9. The server management framework according to claim 1, wherein the management board CPLD is configured to transmit a power button signal and an interrupt signal to the platform controller hub.

10. A server comprising a server management framework, wherein server management framework comprises:
    a management board, wherein the management board comprises a baseboard management controller, a platform controller hub, and a management board complex programming logic device (CPLD), and a first end of the management board CPLD is connected to the platform controller hub; and
    a motherboard, wherein the motherboard comprises a central processing unit and a motherboard CPLD, a first end of the motherboard CPLD is connected to the central processing unit, and a second end of the motherboard CPLD is connected to a second end of the management board CPLD, so that the baseboard management controller communicates with the management board CPLD through the motherboard CPLD, and the platform controller hub communicates with the baseboard management controller through the motherboard CPLD and the management board CPLD.

11. The server management framework according to claim 4, wherein general-purpose input/output (GPIO) signals are transmitted between the management board CPLD and the motherboard CPLD.

12. The server management framework according to claim 11, wherein a cyclic redundancy check (CRC) mechanism and an error correcting code (ECC) check mechanism are used by the first LVDS module and the second LVDS module to process data.

13. The server management framework according to claim 11, wherein a data re-transmission mechanism is used to transmit data between the management board CPLD and the motherboard CPLD.

14. The server according to claim 10, wherein the baseboard management controller is connected to the motherboard CPLD through an inter-integrated circuit (I2C) bus interface.

15. The server according to claim 14, wherein the management board CPLD is connected to the motherboard CPLD through a low-voltage differential signaling interface.

16. The server according to claim 15, wherein the management board CPLD comprises a non-maskable interrupt (NMI) generator and a first low-voltage differential signaling (LVDS) module, and the motherboard CPLD comprises an I2C slave interface, an NMI register, and a second LVDS module;

wherein the baseboard management controller is connected to a first end of the I2C slave interface through the I2C bus, a second end of the I2C slave interface is connected to a first end of the NMI register, and the platform controller hub is connected to a first end of the NMI generator; and a second end of the NMI register is connected to a first end of the second LVDS module through an NMI_TRIGGER signal and an NMI_DONE signal, a second end of the second LVDS module is connected to a first end of the first LVDS module through a low-voltage differential signal, and a second end of the first LVDS module is connected to a second end of the NMI generator through the NMI_TRIGGER signal and the NMI_DONE signal.

17. The server according to claim 16, wherein the baseboard management controller is configured to write data into the NMI register through an I2C command;

the motherboard CPLD is configured to parse the data written into the NMI register to obtain state information of the NMI register, and transmit the state information to the management board CPLD by the second LVDS module; and the management board CPLD is configured to receive the state information by the first LVDS module, and transmit the state information to the NMI generator, so that the NMI generator generates an interrupt signal based on the state information and transmits the interrupt signal to the platform controller hub.

18. The server according to claim 17, wherein the management board CPLD is further configured to generate an interrupt_done signal by the NMI generator in response to the interrupt signal having being transmitted, and start a timer in response to the interrupt_done signal being generated;

the motherboard CPLD is configured to receive the interrupt_done signal, clear data in the NMI register, and transmit information of the NMI register with the data being cleared to the management board CPLD;

the management board CPLD is further configured to reset the timer in response to receiving the information of the NMI register with the data being cleared; or the management board CPLD is further configured to regenerate an interrupt signal and feed back an interrupt_done signal again in response to having not received the information of the NMI register with the data being cleared.

19. The server according to claim 10, wherein the motherboard further comprises a power chip and a power supply unit (PSU); and the power chip and the PSU are both connected to the motherboard CPLD.

20. The server according to claim 10, wherein the management board further comprises an indicator light connected to the management board CPLD;

wherein the management board CPLD is configured to transmit a user indicator light signal and a health indicator light signal to the indicator light.

* * * * *